United States Patent
Zakula, Sr. et al.

[19]

[11] Patent Number: 6,158,602

[45] Date of Patent: Dec. 12, 2000

[54] RAILWHEEL SYSTEM FOR SUPPORTING LOADS ON A ROAD-TRAVELING GANTRY CRANE

[75] Inventors: Daniel Brian Zakula, Sr., Mokena, Ill.; Eric Brian Van Gorp, Schererville, Ind.

[73] Assignee: Mi-Jack Products, Inc., Hazel Crest, Ill.

[21] Appl. No.: 09/435,264

[22] Filed: Nov. 5, 1999

Related U.S. Application Data

[63] Continuation-in-part of application No. 09/024,241, Feb. 17, 1998, abandoned.

[51] Int. Cl.[7] ........................................... B66C 5/00
[52] U.S. Cl. .................. 212/270; 105/215.2; 212/312; 212/344
[58] Field of Search .................. 105/215.2; 212/270, 212/312, 324, 325, 343, 344

[56] References Cited

U.S. PATENT DOCUMENTS

| | | | |
|---|---|---|---|
| 1,853,572 | 4/1932 | Nugent | 105/215.2 |
| 2,120,098 | 6/1938 | Hug | 105/215.2 |
| 2,135,307 | 11/1938 | Keator | 105/215.2 |
| 2,150,348 | 3/1939 | Strauss | 105/215.2 |
| 3,247,974 | 4/1966 | Dechantsreiter | 212/326 |
| 4,708,066 | 11/1987 | Heckman | 105/215.2 |

FOREIGN PATENT DOCUMENTS

| | | | |
|---|---|---|---|
| 314212 | 9/1919 | Germany | 105/215.2 |
| 364635 | 3/1939 | Italy | 105/215.2 |
| 331913 | 7/1930 | United Kingdom | 105/215.2 |

*Primary Examiner*—Thomas J. Brahan
*Attorney, Agent, or Firm*—Leydig, Voit & Mayer, Ltd.

[57] ABSTRACT

A gantry crane is provided which is equipped with standard wheels having rubber tires for free maneuverability on a road surface, such as asphalt, gravel, pavement, etc., wherein the crane is additionally equipped with a plurality of railwheels to provide auxiliary support one or more rails in the loading area. In a first mode, the crane is supported only on rubber tires for driving on a paved surface, and in other modes, one or both sides of the crane are supported via the railwheels on rails. In an embodiment, a railwheel may be securely mounted coaxially to the steel rim of the respective steel wheels, forming a dual or combination wheel. The railwheels are sized relative to the tires of the standard wheels so that the railwheel does not impair non-rail loading operations, i.e., the railwheel vertically clears the ground even when the tires deflect as the crane is fully loaded. Railwheels may be provided on one or both sides of the crane. Each of the railwheel has dual flanges to maintain rollable positioning of the railwheel on the rail, enabling the crane to be driven in a self-steering manner.

3 Claims, 9 Drawing Sheets

RAILWHEEL SYSTEM FOR SUPPORTING LOADS ON A ROAD-TRAVELING GANTRY CRANE

CROSS-REFERENCE TO RELATED APPLICATION

This is a Continuation-In-Part of U.S. Ser. No. 09/024,241, filed on Feb. 17, 1998, now abandoned.

BACKGROUND OF THE INVENTION

Gantry cranes are conventionally used in railyards or other types of shipping yards for loading and unloading large containers or other loads to and from railcars, trailers, etc. Such a crane typically has a steel frame including four vertical columns located at corners of the crane. The columns are joined by upper horizontal beams. These beams support a movably suspended lifting mechanism, known as a grappler or spreader, configured to engage, lift and lower a container or load.

The crane runway surface of a shipping yard may be asphalt, concrete, gravel, dirt, or another suitable surface, collectively referred to herein as a "road surface." So that a conventional gantry crane can be driven around on the road surface of a shipping yard, the crane is equipped with four corner-mounted sets of one or more wheels, referred to herein as "roadwheels" (such cranes are generally described herein as "road traveling" cranes). More specifically, each of the roadwheels is mounted in a yoke or truck at the bottom of a respective one of the columns. Typically, at least two of the roadwheels are steerable, and at least two of the roadwheels are motor-driven. The operator can thereby maneuver the crane around the shipping yard as desired for lifting, lowering, and moving containers.

Conventionally, each of the roadwheels has a rigid steel center having a circumferential rim with a rubber off-highway tire mounted concentrically thereon. The rubber tires are compressible under a load. More specifically, the rubber tires deflect against the road surface under the weight of the crane. The amount of deflection increases due to weight of a container lifted by the lifting apparatus. Additionally, the lifting apparatus may be traversed along the horizontal upper beams of the gantry crane, shifting the weight distribution non-uniformly among the respective roadwheels depending on the particular position of the grappler or spreader. Additionally, tire deflection may result in increased tire wear against the road surface.

It is desirable to minimize tire deflection in order to reduce tire wear. It is also desirable to improve steering control of gantry cranes which lift heavy loads.

SUMMARY OF THE INVENTION

In shipping yards, standard railroad tracks are commonly present to accommodate the movement of freight trains, railcars and/or other rail-supported equipment. These tracks are often located immediately adjacent a location where containers must be loaded or unloaded from railcars, trucks, pallets, etc. The loading and unloading of containers in such environments is typically performed by a gantry crane.

Accordingly, a specific object of the invention is to provide a railwheel for a road-traveling gantry crane to utilize a rail of a standard railroad track for auxiliary load support.

Another specific object of the invention is to provide a railwheel for a road-traveling gantry crane to utilize a rail of a standard railroad track to provide crane-steering guidance.

The present invention achieves these objects by providing a gantry crane that may be selectively driven only on wheels having rubber tires and, the crane is additionally equipped with steel railwheels on one or both sides of the crane so the crane can be operated in a rail-supported mode.

The present invention also achieves these and other objects by providing a system including a plurality of railwheels which are respectively mounted relative to the roadwheels of a gantry crane. The system of the invention includes an apparatus and method for transferring crane loads through the railwheel to the rail. In a particular embodiment, the railwheel is mounted on a common axle to the rigid wheel center of the roadwheel. The rigid wheel center may have a flange to accommodate mounting of the railwheel thereto by bolts. Railwheels are provided on one or both sides of the crane.

The railwheel is sized relative to the tire so that a clearance exists between the rail wheel flange and the road surface when the tire is at maximum deflection under the maximum load. This allows the crane to travel freely about in the loading yard supported only by its rubber tires on the crane runways and to lift loads in a conventional manner.

For placing the railwheels to ride along the rail, according to one embodiment of the invention, a ramp is positioned adjacent the rail. The crane is driven so that the rubber tires adjacent the railwheels travel down the sloping ramp until the railwheels contact the rail. In this embodiment, it is possible that the roadwheels may become suspended over the ground, with all of the wheel loading being transmitted from the associated railwheel to the rail. More specifically, as the crane continues moving, the railwheel rides along the rail, while the ramp may continue to slope downwardly, away from the tire of the associated roadwheel. Thereby, one side of the crane is supported by the railwheels on the rail, and the other side of the crane is supported by the rubber tires on the road. Also, in an embodiment wherein railwheels are equipped on both sides of a crane, a second rail and ramp arrangement may be provided at the other side of the crane to position both sides of the crane supported on the rails.

According to an embodiment of the invention, the railwheel is normally raised over the ground a distance greater than the height of a rail during unloaded or light loading conditions. In such a state, the railwheel does not contact the rail, and, therefore, all of the axle load is borne by the roadwheel and is transmitted to the ground via the tire. The difference in circumference between the railwheel and the tire provides vertical clearance of the railwheel over the ground sufficient that the crane may be maneuvered to position the railwheel vertically over the rail. However, the difference in circumference is also such that when the tire deflects against the road a predetermined amount due to increased loading, the railwheel moves downwardly to contact against the rail. At this point, additional loading is transmitted to the rail through the railwheel, and further deflection of the tire of the associated roadwheel is prevented. Such an embodiment advantageously limits the amount of tire deflection beyond a predetermined amount.

An advantage of the present invention is that it provides a crane that can operate fully on rubber tires on both sides of the crane, or supported on a rail on one side, or supported on a rail on both sides.

The crane utilize one of the rails of a railroad track, independently of the gauge of the track. This advantageously permits the crane to be used in an environment with a railroad track without a need to adapt the crane for a particular track gauge.

A further advantage of the present invention is that it provides a dual-flange railwheel which guides movement of the gantry crane along the rail, eliminating steering effort by the operator.

Additional features and advantages of the present invention are described in, and will be apparent from, the disclosure herein, including the drawings, description, and claims.

DETAILED DESCRIPTION OF THE PREFERRED EMBODIMENTS

Figure 1:
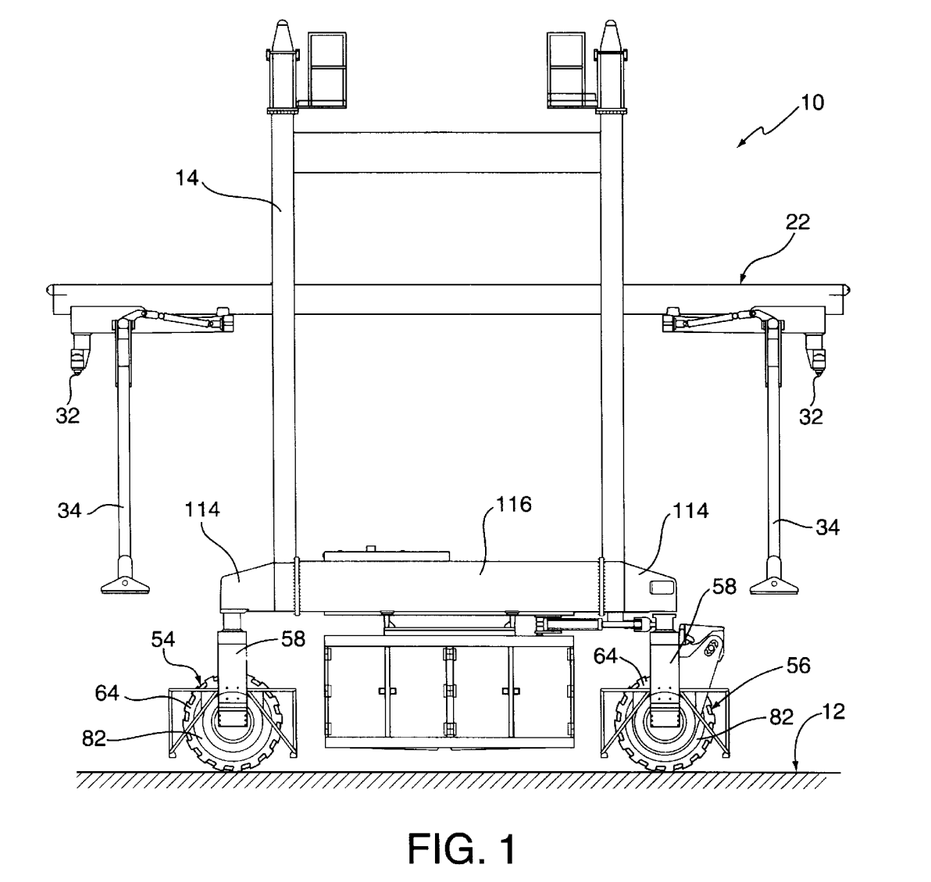
FIG. 1 is left side elevational view of a gantry crane according to the invention.
Figure 2:
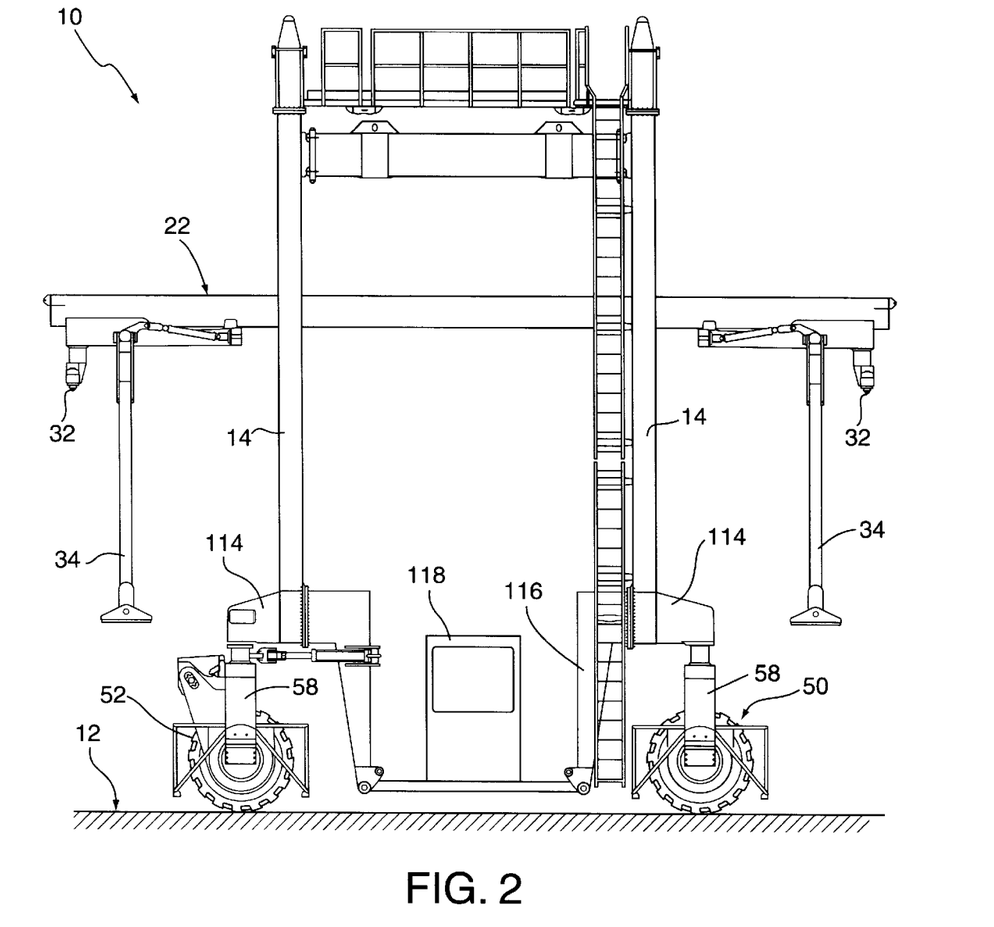
FIG. 2 is right side elevational view of the gantry crane of FIG. 1.
Figure 3:
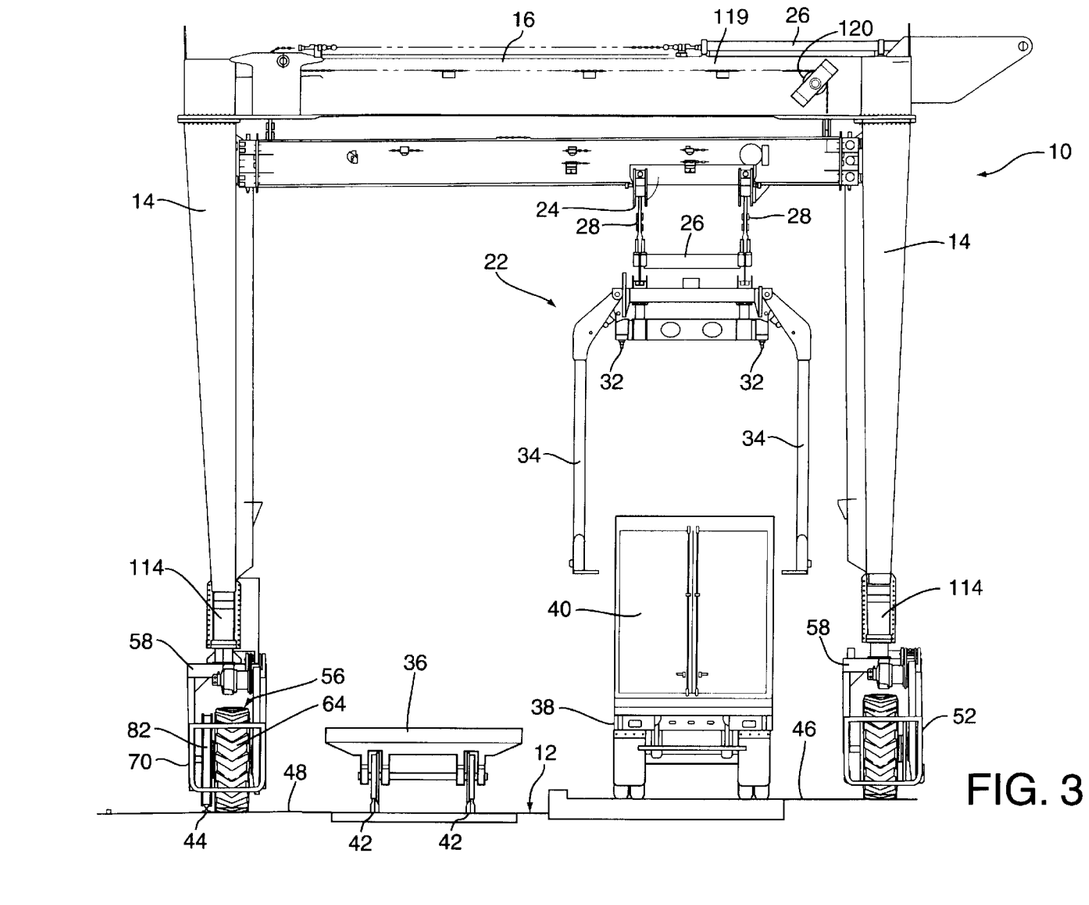
FIG. 3 is a rear elevational view of the gantry crane of FIGS. 1 and 2 on the road surface during a lifting operation to move a container between a truck chassis and a rail car.

Now turning to the Figures, wherein like numerals designate like components, in FIGS. 1–3 there is shown a gantry crane 10 constructed in accordance with teachings of the present invention. As shown, the crane 10 rests on an operating surface 12, such as the ground surface of a shipping yard. In a first mode, the crane 10 is operable to freely maneuver around on the ground surface, supported only on rubber tires. Additionally, as described below in greater detail, the crane according to the invention can be operated in modes by which one or both sides of the crane are supported on rails.

Generally, the crane 10 has a four vertical columns 14 which are joined by upper beams 16. Although crane various structures are possible, the illustrated embodiment includes vertically-movable beams 18 which are driven along a track 20 (FIG. 3) fixed to the respective columns 14. A lifting mechanism 22 is movably mounted to the beams 18. More particularly, as shown in FIG. 3, each of the beams 18 is equipped with a traversible trolley 24 which is movable along the respective beam 18. Although other vertical lifting devices are possible, the illustrated embodiment includes a hoist cylinder 26 mounted on each horizontal member 16. Each hoist cylinder is attached to its respective vertically movable beam 18 by a set of chain or cables 119, and rollers or sheaves 120. Extending or retracting the hoist cylinder 26 lowers or raises vertically movable beam 18. By moving the trolleys 24, the lifting mechanism 22 may be traversed from side to side as desired. The lifting mechanism 22 is configured to engage an object in an appropriate manner as is known in the art, such as, for example, with twistlocks 32 and/or grabbing arms 34. Each of the columns 14 is attached to a column support member 114 formed by a portion of a baseframe 116. A cab 118 is mounted to occupy an operator, and the cab 118 contains controls for operating the crane 10.

Still referring to FIG. 3, the crane 10 is illustrated in an exemplary loading position over a rail car 36 and a road trailer 38. A container 40 is illustrated which can fit on either the rail car 36 or the trailer 38. The rail car 36 rests on rails 42, and another rail 44 is disposed nearby. Such a container 40 is commonly moved between road and rail transportation modes, as shown.

In the embodiment illustrated in FIG. 3, the operating surface 12 includes truck portion 46 supporting the road trailer 38 and an adjacently-positioned rail portion 48 on which the rails 42, 44 are fixed or embedded. While the operating surface 12 is shown as having different elevations among the portions 46, 48, the invention may also be used in environments where this is not the case.

So that the crane 10 can be driven and maneuvered on the operating surface 12 and around the shipping yard, the crane 10 includes four rotatably mounted roadwheels, a front right roadwheel 50, a rear right roadwheel 52, a front left roadwheel 54 and a rear left roadwheel 56. More specifically, each of the roadwheels 50, 52, 54, 56 is rotatably mounted in a respective truck 58, which is steerably mounted at the bottom of the respective column support member 114. Typically, at least the rear two wheels 52, 56 are steerable, and at least the rear two wheels 52, 56 are drivable in a manner described below.

Figure 4:
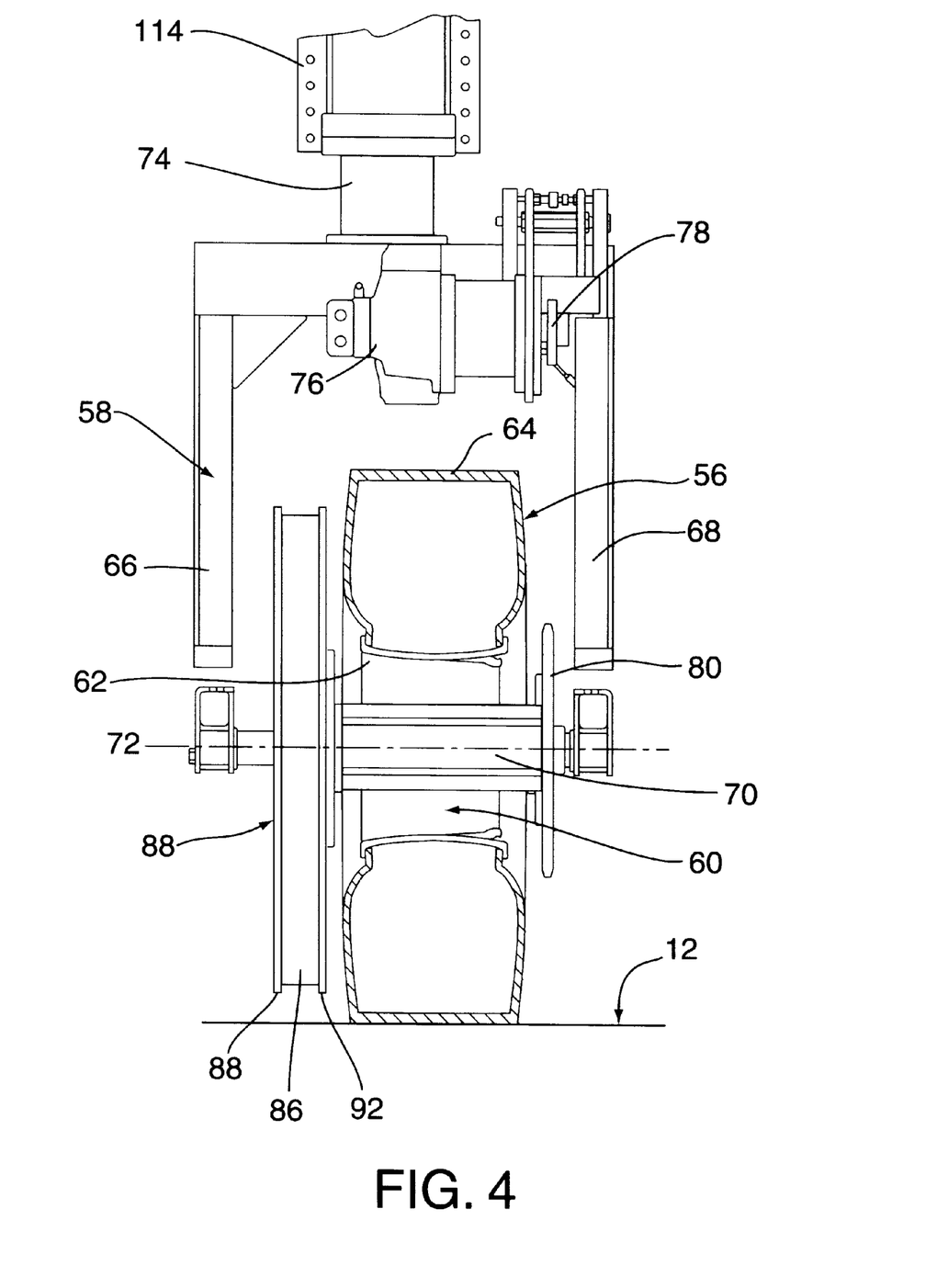
FIG. 4 is a rear sectional, elevational view of a truck assembly having a railwheel according the invention.

As illustrated in FIG. 4, the roadwheel 56 (as well as each of the other respective roadwheels 50, 52, 54) generally has a rigid wheel center 60, having a circumferential rim 62 and a tire 64 which is concentrically mounted on the rim 62. Each of the roadwheels 50, 52, 54, 56 includes a resilient tire 64 made of rubber or some other suitable material. Preferably, the tire 64 is a large diameter tire having a construction of the off-highway class. Off-highway tires can experience much greater deflection than highway tires because off-highway tires are typically capable of supporting wheel loading in excess of thirteen times the wheel loading capacity of highway tires.

As also shown in FIG. 4, the truck 58 includes a first side 66 and a second side 68, and an axle 70 fixed to extend between the first and second sides 66, 68. The axle 70 is disposed along an axis 72. The wheel center 60 is axially mounted to the axle 70 to centrally rotate around the axis 72. The truck 58 is mounted to the side beam or column 14 by a swivel joint 74. A hydraulic drive motor 76 is mounted to the truck 58 and drives a sprocket 78 which transfers drive rotation to a sprocket 80 fixed to the wheel center 60 via a chain (not shown) or gearing.

When the column 14 exerts a downward load against the truck 58, the truck 58 transfers force through the axle 70, which in turn transfers the load to the rigid wheel center 60 of the roadwheel 56, which in turn transfers the load to the tire 64 which deflects against the operating surface 12. Accordingly, the rigid wheel center 60 moves downwardly a corresponding amount. The amount of downward deflection at a particular tire 64 corresponds to the amount of loading on the respective truck 58, which may vary depending on the weight of the container 40 (FIG. 3), or the position of the lifting mechanism 22 affecting weight distribution. Typically, the tire 64 is hollow and filled with pressurized air, however, resilient solid tires or non-pressurized tires may be possible in some embodiments. This description also applies to the roadwheels 50, 52 and 54.

According to the invention, a railwheel is mounted relative to the roadwheel, and the railwheel can be positioned to ride in contact on a rail, carrying some or all of the load from a respective wheel truck on a gantry crane. The railwheel has a smaller radius than the tires of the roadwheels so that the so that the crane can be supported and driven only on the tires while maintaining a suitable clearance between the railwheel and the road surface.

In an embodiment, the railwheel can be positioned onto the rail by tire deflection in excess of a predetermined amount, transferring excess loading to a standard traintrack rail adjacent the loading site. To facilitate a transfer of the excess load to the rail 44, instead of to the operating surface 12 via the tire 64, the crane 10 includes at least one railwheel 82 which is sized and mounted relative to the roadwheel 56 such that loading on the axle 70 exceeding a predetermined limit is delivered from the railwheel 82 to the adjacent railroad rail 44 under certain loading conditions.

On the illustrated crane 10, as shown in FIGS. 1 and 3, each of the left roadwheels 54 and 56 is preferably equipped with a respective railwheel 82 in the manner described herein. Depending on the particular application of the crane 10, it may be desirable to equip some or all of the roadwheels with respective railwheels 82. The railwheels 82 respectively mounted on the roadwheels 54, 56 are located at an outer side of the roadwheels 54, 56 and are both positionable against the track 44 in the manner described below in greater detail.

As illustrated in FIGS. 4–7, the railwheel 82 is a dual-flange type wheel. The railwheel 82 is generally formed of a rigid steel disc-shaped body 84 (FIG. 5), having a circular support surface 86 for contacting the rail 44. The railwheel 82 additionally includes first and second circumferential flanges, 88 and 90, respectively located at opposite sides of the support surface 86. The railwheel 82 is configured to rollably receive the standard-width rail 44 against the support surface between the first and second flanges 88, 90. The flanges 88, 90 maintain the position of the railwheel 82 on the rail 44. Preferably, some amount of play exists between the flanges 88, 90 to assist in positioning the railwheel 82 on the rail 44.

Figure 5:
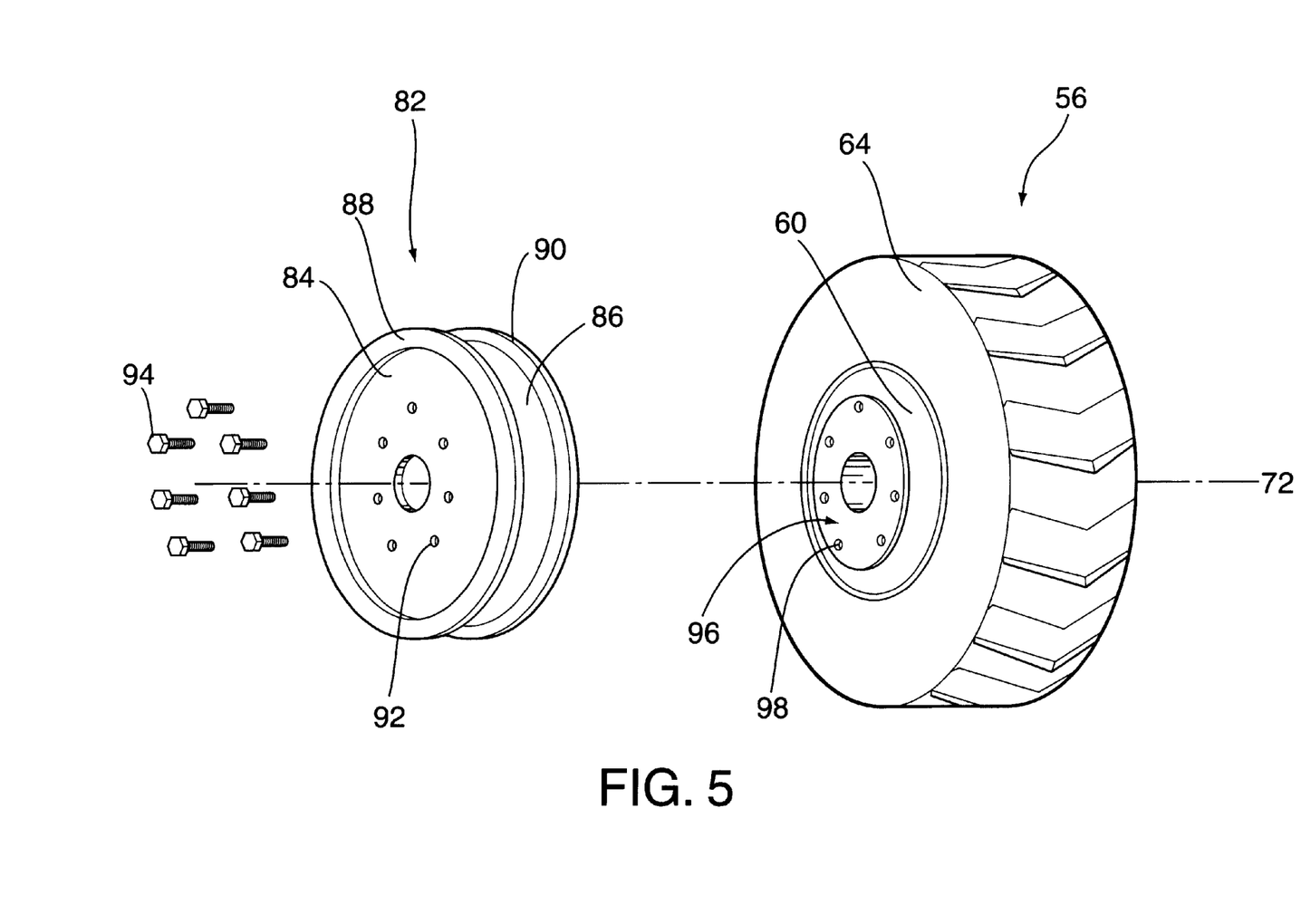
FIG. 5 is an exploded perspective view of a mountable railwheel and roadwheel according to the invention.

As shown in FIG. 5, the railwheel body 84 has boltholes 92 disposed therein to permit mounting of the railwheel 82 relative to the roadwheel 56 with bolts 94. In the illustrated, embodiment, the railwheel 82 is mounted on the common axis 72 with an associated one of the roadwheels 56 by securing the railwheel 82 to the rigid wheel center 60 of the roadwheel 56. So that the railwheel 82 may be mounted to the wheel center 60, the wheel center 60 includes a mounting flange 96. The mounting flange 96 has threaded boltholes 98 to receive the bolts 94. The bolts 94 are extended through the boltholes 92 in the railwheel 82 and threaded into the mounting flange 96, so that the railwheel 82 is secured to the roadwheel 56. In another embodiment, the bolts 94 are long enough to extend though unthreaded holes 98 in the mounting flange 96, and the protruding portion of the bolts 94 can be secured with nuts. The flange 96 holds the railwheel 82 at a sufficient axially-spaced position relative to the roadwheel 56 such that the railwheel 82 will not be contacted by the laterally deflectable tire 64. The mounted railwheel 82 and associated roadwheel 56 are mounted within the truck 58 to commonly rotate on the axis 72.

The structure described herein for mounting the railwheel to the roadwheel is exemplary, and it is noted that other mounting means may be used. The scope and advantages of this invention are not limited to a particular structure for attaching the railwheel to the rigid rim assembly of the rubber tire.

Figure 6:
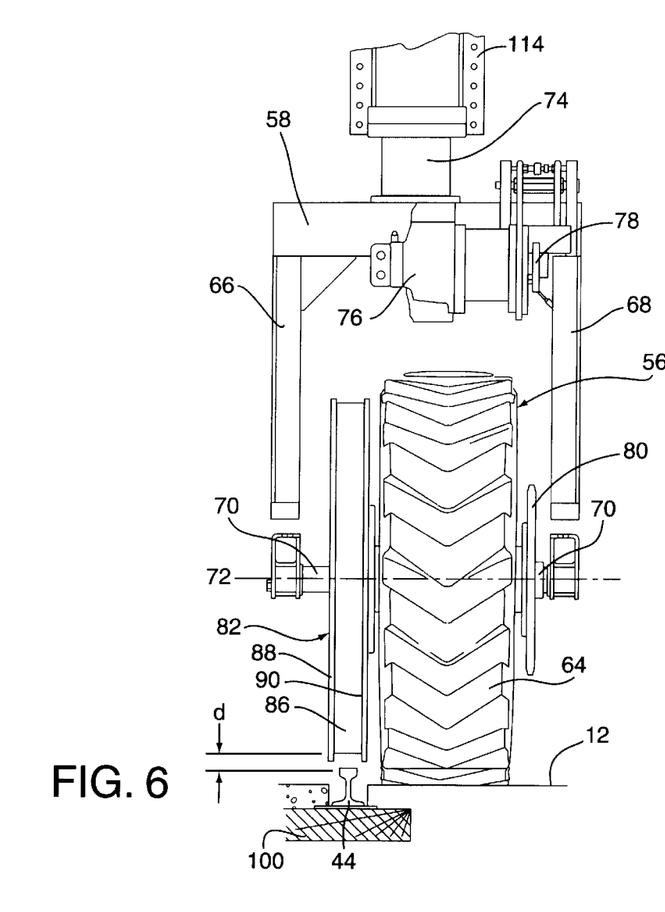
FIG. 6 is a rear elevational view of a truck assembly subjected to a loading condition resulting in a sufficiently low amount of tire deflection such that the railwheel is vertically elevated above the rail.

In FIG. 6, the roadwheel 82 is shown positioned on the operating surface 12 near the rail 44. The railwheel 82 is sized relative to the outer diameter of the tire 64 of the associated roadwheel 56 so that when normal or light load transferred to the roadwheel 56 from the axle 70, the tire 64 deflects only a small amount and bears all of the load from the truck 58 against the operating surface 12. In this condition, the railwheel 82 is spaced a distance above the operating surface 12, permitting the crane to be freely driven about on the tires only, even in a filly loaded condition. More specifically, the flanges 88, 90 of the railwheel 82 have an outer diameter less than an outer diameter of the tire 64 of the roadwheel 56, so that the flanges 88, 90 of the railwheel 82 are normally held a clearance distance above the height of the rail 44. Thus, the railwheel 82 does not interfere with normal driving of the crane 10 on the operating surface 12 during a low-loading condition, and the crane 10 can be driven into a position wherein the railwheel 82 is positioned vertically above a standard rail 44. The crane 10 is then in position to perform a loading operation. In this low-loading condition, the support surface 86 of the railwheel 82 is vertically spaced a distance d above the rail 44.

Figure 7:
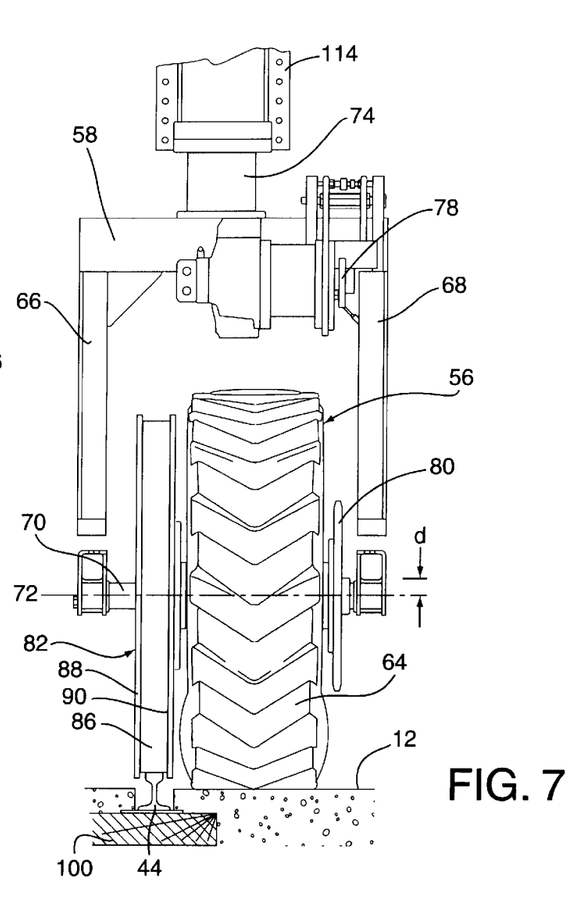
FIG. 7 is a rear elevational view of the railwheel and roadwheel assembly of FIG. 6 subjected to a relatively higher loading condition resulting in a greater amount of tire-deflection such that the railwheel is lowered to contact the rail.

When the crane 10 lifts a container 40 (FIG. 3) or other load, the load is distributed from the trucks 58 among the respective roadwheels 50, 52, 54, 56, causing the tires 64 to correspondingly deflect. Referring to FIG. 7, deflection of the tire 64 causes a corresponding downward movement of the axis 72 and the railwheel 82. According to the invention, the loading from the truck exceeds a predetermined limit, the tire 64 has deflected a corresponding amount resulting in downward movement of the axis 72 by the distance d. This moves the railwheel 82 downwardly to contact the rail 44, thereby transferring excess loading from the truck 58 to the rail 44. At this point, loading on the tire 64 is limited, and further deflection of the tire 64 is prevented.

FIGS. 6 and 7 illustrate the rail 44 as having a portion embedded into the operating surface 12 in a sunken manner, although the rail 44 partially protrudes above the operating surface 12. The rail 44 is supported by a railroad tie 100 which lies under the operating surface 12. It is noted that the invention may be used with other mounting configurations of the rail 44 relative to the operating surface 12, so long as the dimensional differences between the railwheel 82 and the tire 64 result in the effect described herein.

In connection with the embodiment of FIGS. 6 and 7, depending on the spring rates of the tires 64, structural dimensions of the crane 10 (FIG. 3), and other design considerations, the amount of load on the particular truck 58 which exceeds the load amount required to displace the railwheel 82 against the rail 44 can be, for example, the result of the lifting of the container 40 from either the road trailer 38 at the right side of the crane 10 or from the rail car 36 at the left side of the crane 10. The crane 10 could be designed so that the limit is exceeded as a result of moving the suspended container 40 from right to left (relative to FIG. 3) via the traversible trolleys 24, altering the weight distribution among the trucks 58.

When a container 40 has been lifted by the crane 10, it is sometimes desirable to drive the crane 10 forwardly or rearwardly along the direction of the rail 44 in order to move the lifted container 40 to a desired location. When loading is sufficient such that the front and rear railwheels 82 are contacting the rail 44, the crane 10 may be driven in a self-steering manner. In particular, the railwheels 82 roll along the rail 44, tracking the movement of the crane 10 in a self-guiding manner along the direction of the rail 44. This eliminates a need for the crane operator to provide steering input.

At some shipping yards, the rail 44 has an end which tapers downwardly to become flush with the ground. Thus, when the crane 10 is driven far enough along the rail 44, the railwheels 82 eventually lose contact with the tapered rail, transferring all of the load from the respective truck 58 to the operating surface 12 through the tire 64. In the embodiment shown in FIGS. 6 and 7, the tires 64 of the associated roadwheels 54, 56 fixed with the railwheels 82 can advantageously provide driving traction against the road surface when the railwheels 82 track along the rail 44.

Figure 8:
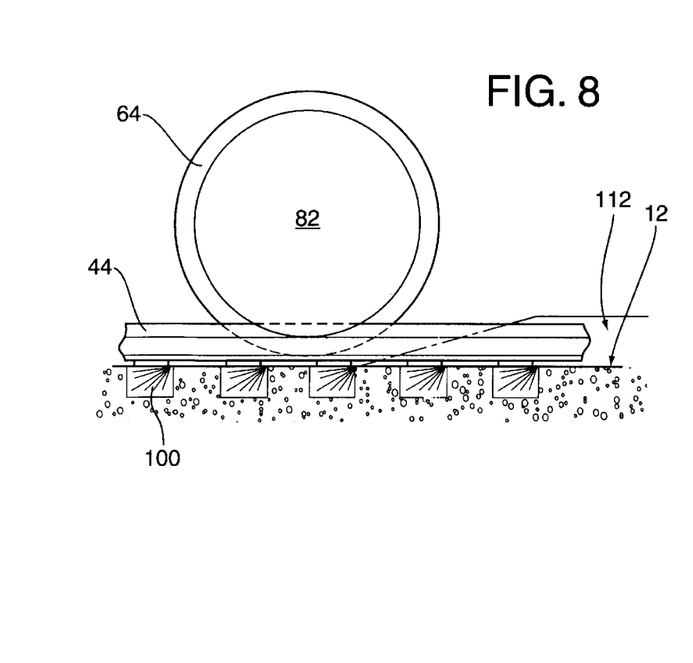
FIG. 8 is a schematic side view of the railwheel and roadwheel assembly riding on the rail, as positioned near a sloping ramp on which the tire can be driven for setting the railwheel on the rail.

Referring now to FIG. 8, according another embodiment of the invention, the transfer of truck loading to the rail 44, and relieving the load on the tires 64, can also be accomplished by providing a ramp 112 adjacent to rail 44 to accommodate the rubber tires 64 of the left-side roadwheels 54, 56. The crane 10 is driven so that the rubber tires 64 adjacent the railwheels 82 travel down the sloping ramp 112 until the railwheels 82 respectively contact the rail 44. In particular, as the crane continues moving, the railwheel 82 rides along the rail 44, while the ramp 112 may continue to slope downwardly away from the tire of the associated roadwheel. Thereby, one side of the crane 10 is fully supported by the railwheels 82 on the rail 44. The other side of the crane may be supported by the rubber tires 64 on the operating surface 12, or in an appropriate situation, in an embodiment wherein both sides of the crane are equipped with railwheels, the other side of the crane may also be supported on a parallel rail.

Figure 9:
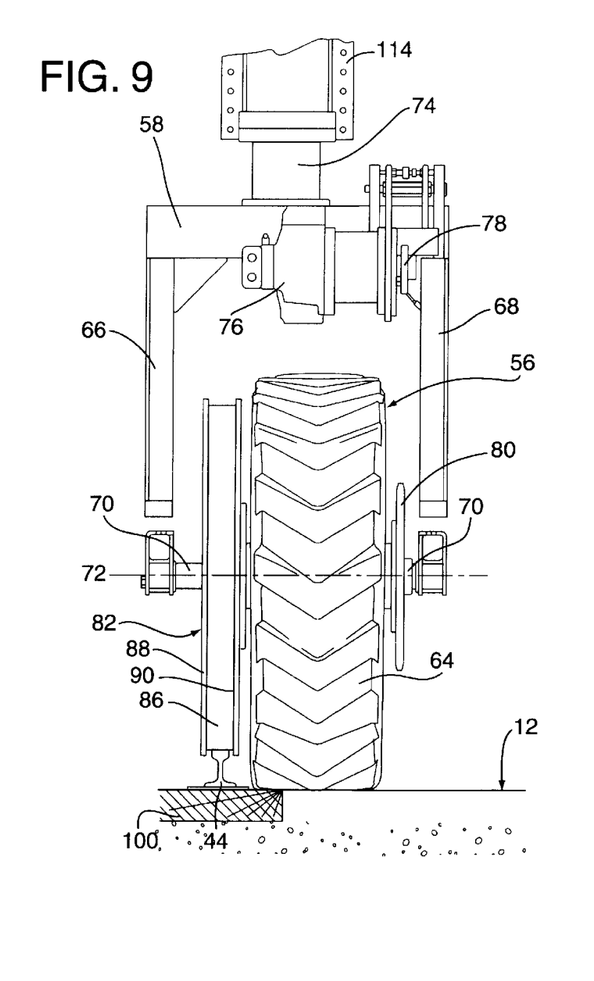
FIG. 9 is a rear elevational view of the railwheel and roadwheel assembly wherein the truck load is carried by the railwheel on the rail, the tire carrying none of the load or a negligible load.

When the railwheel is supporting the crane on a rail, as illustrated in FIG. 9, depending on the environment, it is possible that the tires may contact the ground or railroad ties adjacent the rail, however the railwheel is dimensioned relative to the roadwheel such contact is insignificant. Such contact, if it occurs, is so slight that the tires will not exert any substantial amount of force to the ground, and accordingly, the tires will cause no appreciable damage the ground or railroad ties. It is also possible that the tires 64 may become suspended over the ground by a vertical clearance.

The ramp is formed in the operating surface 12 on the rail side of the crane in this embodiment so that the load is substantially transmitted from the railwheel 82 to the rail 44, substantially relieving the tire 64 from supporting the load. The tire 64 may incur negligible contact with the tie 100 when the crane is fully supported on the rail 44, as shown in FIG. 9. The embodiment of FIGS. 8 and 9 also provides self-guiding advantages when the railwheels 82 are in contact with the rail 44. Moreover, the embodiment of FIGS. 8 and 9 facilitates a transfer of load to the rail independently of the amount of the load carried by the crane 10.

Figure 10:
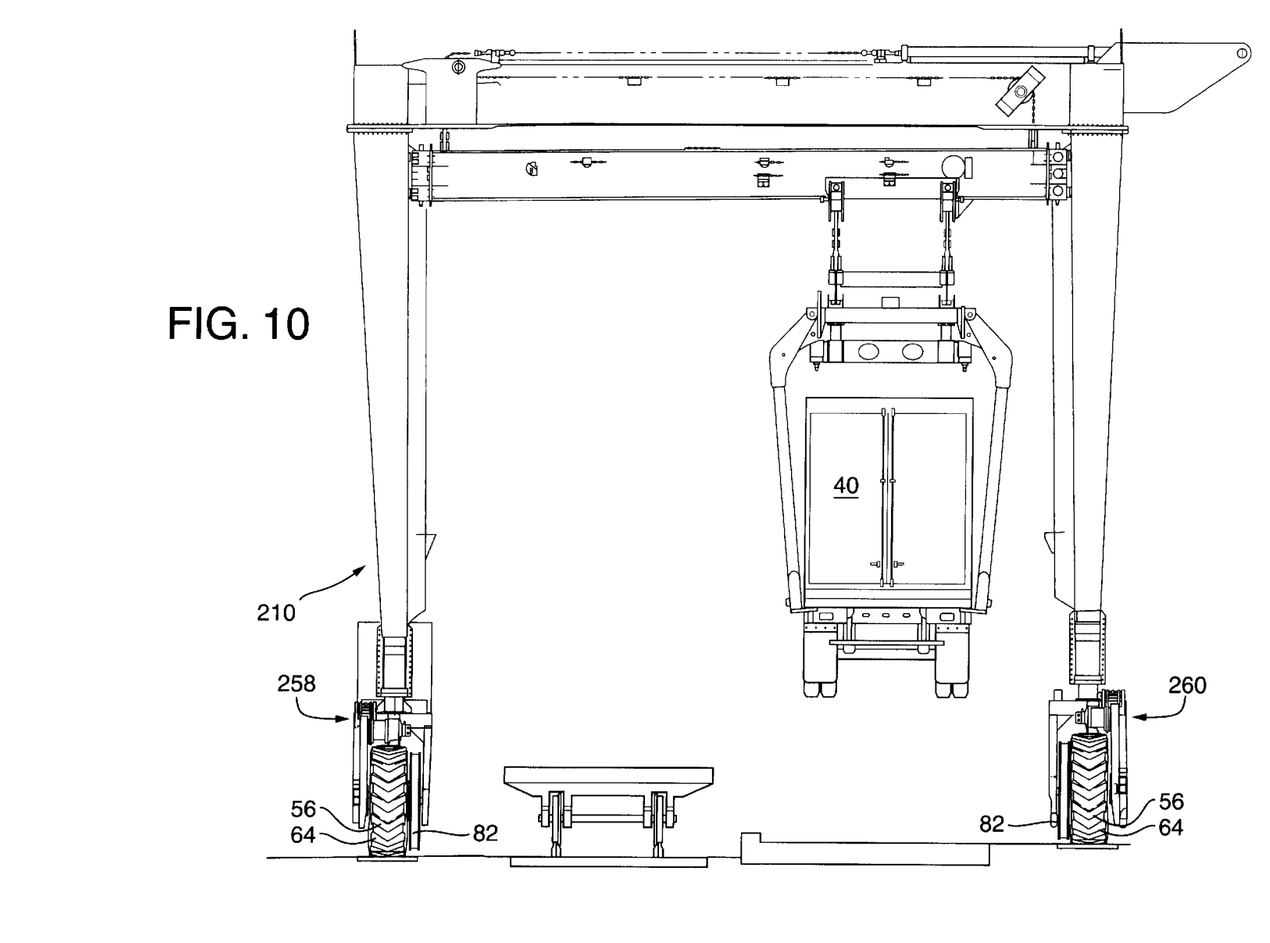
FIG. 10 is a rear elevational view of another embodiment of a gantry crane constructed in accordance with teachings of the invention, wherein both sides of the crane are equipped with railwheels, and wherein the railwheels are located interiorly of respective roadwheels.

A crane 210 is illustrated in FIG. 10 according to another embodiment of the invention. The crane 210 is similar to the crane 10 illustrated in FIG. 3, except the crane 210 of FIG. 10 has left side wheel trucks 258 and right side wheel trucks 260 each being equipped with a railwheel 82 and a roadwheel 56 having a rubber tire 64. Additionally, as shown, each of the railwheels 82 is mounted interiorly relative to the roadwheels 56. The crane 210 of FIG. 10 is also illustrated in a loaded condition, lifting a container 40, yet the railwheels remain positioned above the ground by a vertical clearance. Because of the clearance, the crane 210 can freely drive around on the ground, even in a loaded condition, supported only on the road wheels.

The crane 210 can be also operated in rail-supported modes whereby one or both sides of crane 210 are supported by its railwheels 82 on respective rails. As in the embodiment described in connection with FIGS. 1–9, the railwheels 82 are preferably dual-flange railwheels to provide self-steering guidance along the rails.

Figure 11:
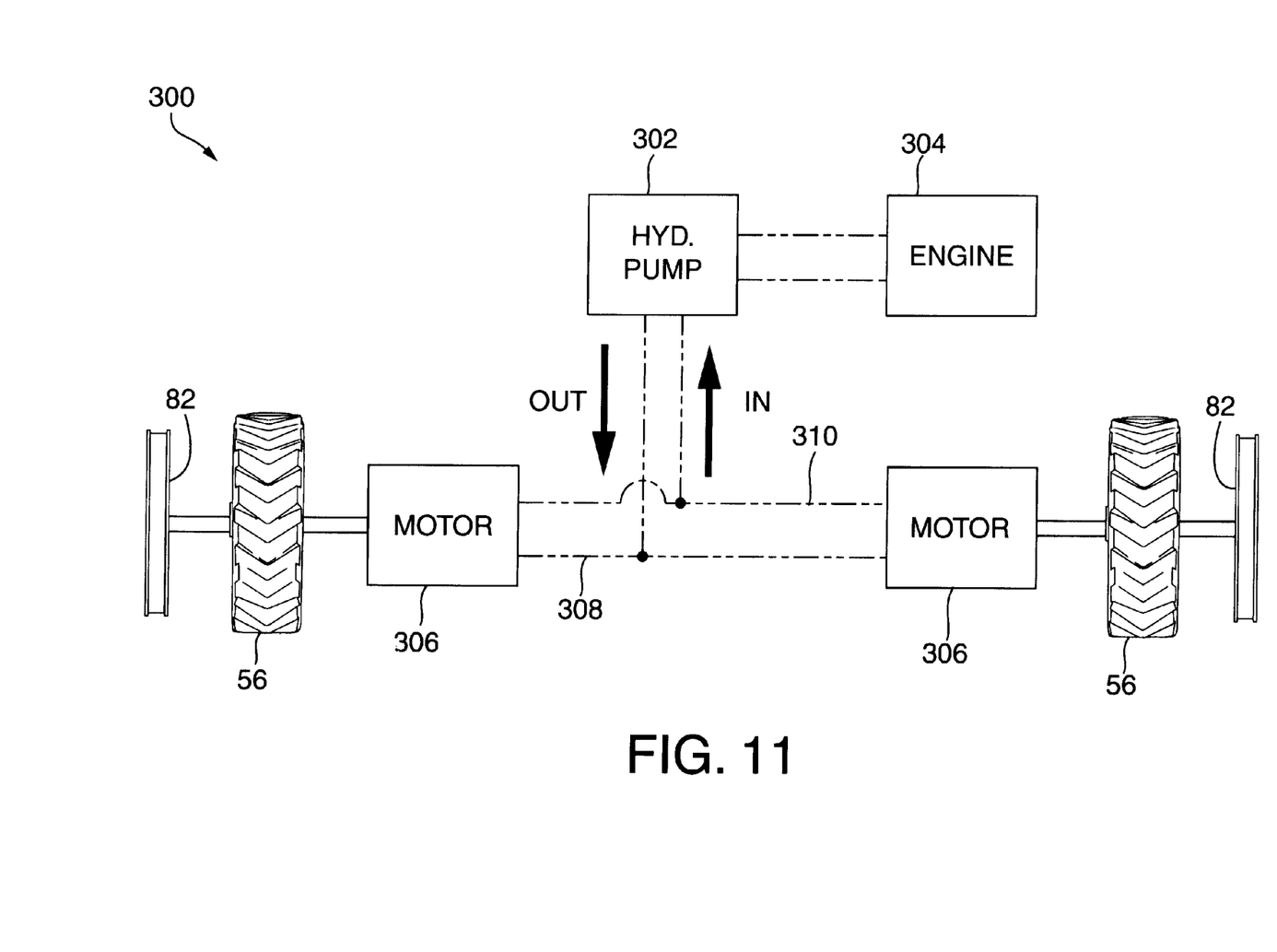
FIG. 11 is a schematic view of a drive system for a gantry crane according to an embodiment of the invention.

A drive system 300 is illustrated in FIG. 11 for controllably driving a pair of wheel assemblies 301 each assembly including a roadwheel 56, on opposite sides of the crane 10 (FIG. 3), 210 (FIG. 10). Additionally, at least one of the wheel assemblies 301 includes a railwheel 82, and in the illustrated embodiment, both of the wheel assemblies 301 include a railwheel 82. The drive system 300 includes a hydraulic pump 302 driven by an engine 304, such as an internal combustion engine. Also, each of the driven wheels assemblies 301 is drivably coupled to a respective independent hydraulic motor 306. The hydraulic pump 302 delivers a pressurized flow of hydraulic fluid though a supply line 308 that commonly supplies both of the hydraulic motors 306. A common return line 310 delivers a return flow of the hydraulic fluid to the pump 302. The system 300 is advantageously simple and cost effective to manufacture and to maintain. The system 300 provides automatic compensation for minor variations in drive motor rotational velocity due to variations in rolling resistance and/or radius. More specifically, because each of the drive wheel assemblies 301, is driven by a respective hydraulic motor 306, slight differences in actual linear velocity due to differences in rolling radius of the drive wheel assemblies 301 (e.g., one side of the crane supported by the tire on the road surface, and the opposite side of the crane 10, 210 being supported by the railwheel 82 on the rail 44) are compensated by the self-steering guidance provided by the flanges 88, 90 (FIGS. 5, 6) of rail wheels 82 as the crane 10, 210 travels along the rail 44. This system 300 is advantageous over a conventional drive system because the system used in the described embodiment of the invention eliminates a need for multiple independent drive systems for independently driving the drive wheels as in a conventional drive arrangement.

Although the invention is described herein with reference to certain preferred embodiments, it is recognized that various changes and modifications will be apparent to those skilled in the art. For example, instead of mounting the railwheel 82 directly to the roadwheel 56, the railwheel 82 could be mounted to another component fixed relative to the crane structure. Also, while the illustrations herein depict the crane 10 moving a container 40 between road and rail modes, the invention could be used for transferring objects and loads in other situations as well. For example, the container 40 may be moved from rail-to-rail modes, road-to-road modes, to or from the ground or a pallet, etc. Also, the railwheel 82 may have a single flange in a situation where such a configuration would provide sufficient guidance, e.g., where the top of the rail is flush with the road surface such that the flange rides in a single groove between the rail 44 and the operating surface 12. Such changes and modifications may be made without departing from the spirit and scope of the invention. Accordingly, the appended claims are intended to cover all such changes and modifications within the spirit and scope of the invention.

What is claimed is:

1. A method for handling objects comprising the steps of:

providing a gantry crane having a frame, a lifting apparatus mounted to the frame for lifting an object; a plurality of wheel trucks mounted to the frame, a plurality of roadwheels, each of said roadwheels having a respective resilient tire supporting the gantry crane on an operating surface and, each of said trucks having at least one of said roadwheels mounted thereto, and at least one railwheel mounted to one of said trucks;

providing a rail fixed relative to the operating surface;

positioning the gantry crane on the road surface over the object adjacent the rail, so that the railwheel is vertically spaced above the rail;

lifting the object; and deflecting the tire in a non-deflated manner as a result of a load from lifting the object, thereby moving the railwheel downwardly to contact the rail.

2. A method according to claim 1, wherein said railwheel includes a circular support surface; and first and second circumferential flanges located at opposite sides of the support surface; and wherein the deflecting step includes the railwheel receiving said rail in contact against the support surface between said first and second flanges.

3. A method according to claim 2, further comprising driving the gantry crane when said railwheel is in contact against the rail in a self-steering manner.

* * * * *